No. 692,869. Patented Feb. 11, 1902.
H. LEMP.
STEERING MECHANISM FOR VEHICLES.
(Application filed Oct. 24, 1898.)
(No Model.)
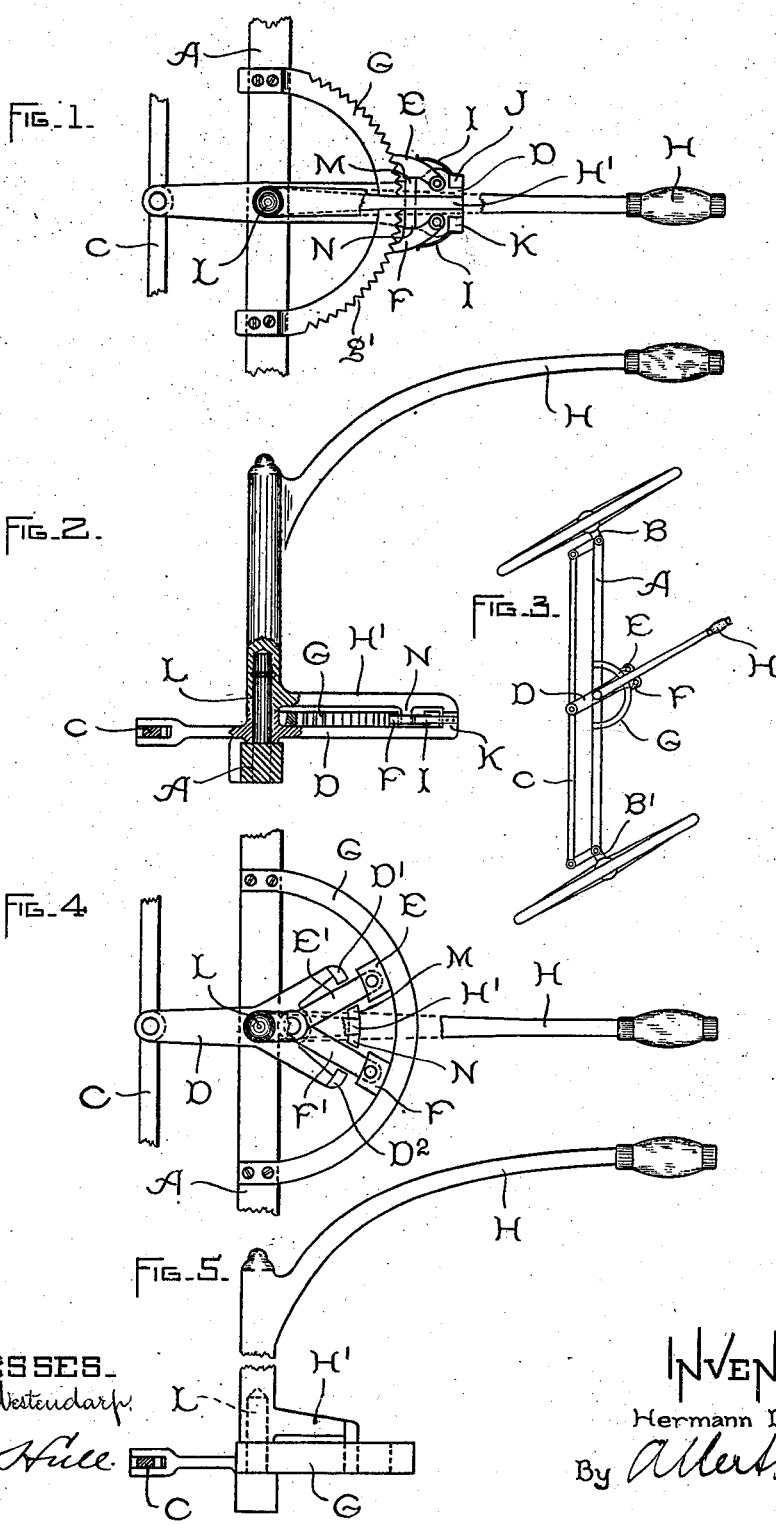
WITNESSES
Henry A Westendarp
B. B. Hill
INVENTOR
Hermann Lemp,
By Albert G. Davis
Atty.

UNITED STATES PATENT OFFICE.

HERMANN LEMP, OF LYNN, MASSACHUSETTS, ASSIGNOR TO ELIHU THOMSON, OF SWAMPSCOTT, MASSACHUSETTS.

STEERING MECHANISM FOR VEHICLES.

SPECIFICATION forming part of Letters Patent No. 692,869, dated February 11, 1902.

Application filed October 24, 1898. Serial No. 694,372. (No model.)

*To all whom it may concern:*

Be it known that I, HERMANN LEMP, a citizen of the United States, residing at Lynn, county of Essex, State of Massachusetts, have invented certain new and useful Improvements in Steering Mechanism for Vehicles, (Case No. 844,) of which the following is a specification.

In automobile vehicles it is desirable to provide a steering mechanism which is capable of handling the vehicle in a smooth easy manner with the minimum strain on the hand of the operator.

My invention has for its objects to provide a steering mechanism for vehicles, particularly of that class known as "automobile" vehicles, which is capable of steering the vehicle in any direction with the minimum effort, but with maximum quickness, and also to provide a steering mechanism in which the wheel strains are not transmitted to the operator, but are taken up by a mechanical lock situated between the wheels and the operating-handle.

My invention further has for its object to provide a mechanical locking device for the steering mechanism of a vehicle in which the locking and unlocking is accomplished automatically and without thought on the part of the operator.

In the accompanying drawings, which illustrate embodiments of my invention, Figure 1 is a plan view of a ratchet-and-pawl locking device, partially broken away. Fig. 2 is a side elevation of the same, with certain of the parts in section. Fig. 3 is a plan view of the lock mounted in position on the axle of a vehicle. Fig. 4 is a plan view, partially in section, of a slight modification in which friction-blocks are substituted for the ratchet and pawls; and Fig. 5 is a side elevation of the same.

Referring more particularly to Fig. 3, which shows the front portion of a vehicle having its wheels supported by a double-axle suspension in the usual manner, A represents the fixed front axle, and pivotally supported thereby are the short axles B and B', upon which the wheels are mounted. The short axles are made in the form of bell-crank levers and are connected by the rod C. Pivotally secured to the fixed axle A by a stud is a steering-lever D, which is secured at the left-hand end to the rod C and on the right-hand end is provided with two pawls E and F, arranged to engage with the semicircular ratchet G. Mounted on the same stud with the lever D is a steering-handle. H, which is arranged to release either the pawl E or F, depending upon which way it is moved from a central position, and also to steer the vehicle.

In Figs. 1 and 2 the parts are shown on an enlarged scale. The semicircular ratchet G is secured by screws to the fixed axle A, and formed on its periphery are teeth $g'$, with which engage the pawls E and F. The pawls E and F are oppositely disposed with respect to each other and are pivotally secured to the lever D and are held in engagement with the ratchet G by the flat springs I. In addition to the pawls the lever D has two stops J and K, the former acting when the handle is moved in one direction from a central position and the latter when the handle is moved in the opposite direction.

The steering-handle H and the lever D are mounted for oscillatory movement on the stud L, which is rigidly secured to the axle A. Moving with and rigidly secured to the handle H is an arm or actuator H', that extends outwardly from the hub of the handle and passes between the stops J and K, a certain amount of lost motion being permitted between them. This lost motion between the steering-handle and the wheels is utilized in releasing the locking device prior to any movement of the steering-wheels.

Mounted on the end of the arm or actuator H' is a pair of pins M and N. The pin M is arranged to move the pawl E out of engagement with the ratchet G during the time that the arm H' is being moved from a position of rest into engagement with the stop J, and the pin N performs the same office for the pawl F when the handle is moved in the opposite direction. With this arrangement it will be seen that the first office of the handle is to release one of the pawls from engagement with the ratchet and then to move the wheels through the lever D and the rod C. As soon as the pressure is removed from the steering-handle it immediately assumes a position intermediate the stops J and K, and the pawls engage with the ratchet G, and any strains to which the wheels are subjected are prevented from being transmitted to the handle by reason of the ratchet and pawls. The locking and unlocking of the pawls is entirely automatic and requires absolutely no thought on the part of the operator. All that it is necessary for the operator to do is to move the handle in the direction which he desires to travel. In case the wheels strike an obstruction in the road while in the act of steering the strain on the wheels will overcome the pressure of the steering-handle, and the pawls will automatically engage with the ratchet and take the shock away from the hand of the operator. With the arrangement of parts as shown the handle indicates by its relative angular position the direction of movement of the vehicle, and the steering is accomplished in a smooth and easy manner and with a minimum effort on the part of the operator.

Referring now to the modification shown in Figs. 4 and 5, in which friction-blocks are substituted for the pawls, the axle is represented by A, the same as before, and mounted on the stud L are the steering-handle H and the steering-lever D, which is connected to the wheel through the rod C. Mounted on the fixed axle A is a semicircular plate G, and engaging with the inner surface are two friction-blocks E and F. The blocks are loosely mounted on separate arms E' and F', which are pivoted to the lever D at one side of the stud L or center of movement of the lever and between it and the plate G. This causes the block E, arm E', and lever D to act as a toggle on one side of the center when the wheels are subjected to strains and prevent the movement of the wheels, while the block F, arm F', and lever D act as a toggle on the other side of the center to prevent movement in the opposite direction. Carried by the steering-lever D are two stops D' and D². These stops are arranged to engage with the arms E' and F' and move them along in the same direction as the steering-handle and the actuator H', a certain amount of lost motion being permitted between the parts to insure their proper operation. In other words, the stops D' and D² are arranged to maintain the arms E' and F', with the attached blocks, in such positions that they will be ready to engage with the plate G in case the vehicle-wheels meet with a road obstruction.

Mounted on the arm or actuator H', which is rigidly connected to the steering-handle, are two stops M and N, the stop M being arranged to strike the arm E' and release the block E when the handle is moved in one direction, while the stop N is arranged to strike arm F when moved in the opposite direction, a slight amount of lost motion being provided between the handle and the steering-wheels for the same reason as described in connection with the first figures. The relation between the steering-handle and the lock is such that a movement of the handle in either direction from a given position will first release the lock and then move the wheels, the lock resuming its normal position automatically as soon as the pressure is removed from the handle.

While two different types of steering mechanism have been shown, it is to be observed that the principles of operation are the same in each case—that is to say, a movement of the steering-handle in any direction causes a corresponding movement of the wheels without thought on the part of the operator as to the locking and unlocking of the wheels, and the wheels are automatically locked, so that strains cannot be transmitted therefrom to the steering-handle either while the handle is set or while in the act of steering.

What I claim as new, and desire to secure by Letters Patent of the United States, is—

1. In a steering mechanism for vehicles, the combination of a fixed support, a semicircular plate or sector secured thereto, a steering-handle, a steering-lever pivotally secured to the support, and connected to a steering-wheel, a pair of arms pivotally secured to the lever, each provided with a loose block that engages with the sector, a pivot for each arm which is located between the center of motion of the lever and the sector; the relation of the lever, arms and pivots being such as to constitute two toggles, whereby the transmission of wheel strains to the steering-handle is prevented.

2. In a steering mechanism for vehicles, the combination of a fixed support, a plate having a semicircular surface secured to the support, a steering-lever, a pair of arms pivotally secured to the lever at a point between the center of motion of the lever and the semicircular surface on the plate, loose blocks mounted on the arms and arranged to engage with the semicircular surface, a steering-handle, and means moving with the steering-handle for moving the blocks out of engagement with the plate when it is desired to steer, the said means having a certain amount of lost motion whereby the arms and blocks are permitted to act as a toggle and prevent the transmission of wheel strains to the steering-handle.

3. In a steering apparatus for vehicles, a controlling member having a swinging movement to steer, an axle, wheel-spindles pivoted thereto, an arm set at an angle on each spindle, and connections intermediate the spindle-arms and controlling member including a double-acting friction-lock, the initial steering movement of said controlling member operating to release said lock, thereby permitting continued movement of the controlling member to change the angular position of the wheel-spindles.

4. A steering wheel or wheels, a manually-operated controller to change the position thereof, friction locking means to maintain the same in a given position, said wheel or wheels being operatively connected with a rotative member of said means, a releasing device connected with the controller, the latter and the rotative member being also connected but having a limited relative movement to operate the releasing device, and means to thereafter effect movement of the said rotative member by the controller independent of the releasing device.

5. In a steering apparatus for vehicles, a controlling member having a swinging movement to steer, an axle, wheel-spindles pivoted thereto, an arm set at an angle on each spindle, and connections intermediate the spindle-arms and controlling member, including a locking means comprising a fixed annular, and a concentric relatively rotatable member, a plurality of interposed locking-dogs to normally prevent relative rotation of said members, and a device to render either dog inoperative, said device and the rotatable member being actuated successively by the steering movement of the controlling member in either direction, whereby the locking means is first released and thereafter the angular position of the spindle changed.

6. In a motion-checking device, the combination of a fixed and a moving element, a friction-plate secured to one of the elements, friction-blocks arranged to engage therewith, a lever pivoted at a point intermediate the ends, pivoted arms mounted on the lever which arms support the blocks, stops carried by the lever for moving the friction-blocks around with said lever, and a connection between the lever and the second element.

7. In a motion-checking mechanism, the combination of an actuator for moving the parts, a fixed support, a moving element, a lever pivoted to the support and connected to the element, a plate mounted on the support, devices engaging with the plate for checking motion, arms pivoted on the lever at a point between its center of motion and the plate, which arms form supports for said motion-checking devices, and a pair of stops for each arm which are disposed on opposite sides thereof so as to impart movement thereto when the actuator is moved.

8. A steering wheel or wheels, a manually-operated controller to change the position thereof, friction locking means to maintain the same in a given position, said wheel or wheels being operatively connected with a rotative member of said means, a releasing device connected with the controller, the latter and the rotative member being also connected but having a limited relative movement, to operate the releasing device, and means to thereafter effect movement of the said rotative member by the controller independently of the releasing device.

In testimony whereof I have hereunto set my hand this 20th day of October, 1898.

HERMANN LEMP.

Witnesses:
A. F. MACDONALD,
DUGALD MCKILLOP.